US009730251B2

(12) United States Patent
Xu et al.

(10) Patent No.: US 9,730,251 B2
(45) Date of Patent: *Aug. 8, 2017

(54) METHOD FOR SUPPORTING AN EMERGENCY CALL IN A MOBILE COMMUNICATION SYSTEM

(71) Applicant: Samsung Electronics Co., Ltd., Suwon-si, Gyeonggi-do (KR)

(72) Inventors: Lixiang Xu, Beijing (CN); Chunying Sun, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,591

(22) Filed: May 16, 2016

(65) Prior Publication Data

US 2016/0262189 A1 Sep. 8, 2016

Related U.S. Application Data

(63) Continuation of application No. 14/457,832, filed on Aug. 12, 2014, now Pat. No. 9,344,871, which is a
(Continued)

(30) Foreign Application Priority Data

Jul. 4, 2008 (CN) .......................... 2008 1 0128235

(51) Int. Cl.
H04M 11/04 (2006.01)
H04W 76/00 (2009.01)
(Continued)

(52) U.S. Cl.
CPC .......... *H04W 76/007* (2013.01); *H04W 4/22* (2013.01); *H04W 60/04* (2013.01);
(Continued)

(58) Field of Classification Search
CPC ..... H04W 88/02; H04W 4/22; H04W 76/007; H04W 76/046; H04W 60/04;
(Continued)

(56) References Cited

U.S. PATENT DOCUMENTS 6,397,054 B1   5/2002  Hoirup et al.
7,215,941 B2   5/2007  Beckmann et al.
(Continued)

FOREIGN PATENT DOCUMENTS

CN        1311963 A       9/2001
KR   10-2008-0057282 A    6/2008

Primary Examiner — Wayne Cai
(74) Attorney, Agent, or Firm — Jefferson IP Law, LLP

(57) ABSTRACT

A method for supporting an emergency service by a mobility management entity (MME) and a base station in a mobile communication system, and a MME and base station, are provided. The method for supporting an emergency service by a MME includes receiving, by the MME, a first message including information associated with an attach request of a terminal from a base station, determining, by the MME, whether the attach request is accepted based on information indicating an emergency service included in the first message, and transmitting, by the MME, a second message to the base station if the attach request is accepted, wherein if the information associated with the attach request includes the information indicating the emergency service, the attach request is accepted, and wherein the information indicating the emergency service is included in the first message using information included in a third message received from the terminal.

22 Claims, 7 Drawing Sheets

Related U.S. Application Data continuation of application No. 13/001,868, filed as application No. PCT/KR2009/003624 on Jul. 2, 2009, now Pat. No. 8,818,323.

(51) Int. Cl.
*H04W 4/22* (2009.01)
*H04W 60/04* (2009.01)
*H04W 76/04* (2009.01)
*H04L 29/06* (2006.01)
*H04W 88/02* (2009.01)

(52) U.S. Cl.
CPC ....... *H04W 76/046* (2013.01); *H04L 65/1069* (2013.01); *H04L 65/1096* (2013.01); *H04M 2207/18* (2013.01); *H04M 2242/04* (2013.01); *H04W 88/02* (2013.01)

(58) Field of Classification Search
CPC .......... H04M 2242/04; H04M 2207/18; H04L 65/1069; H04L 65/1096
USPC ...................... 455/404.1–404.2, 435.1–435.3
See application file for complete search history.

(56) References Cited

U.S. PATENT DOCUMENTS

| | | |
|---|---|---|
| 8,295,830 B1 | 10/2012 | Faccin |
| 2004/0081139 A1 | 4/2004 | Beckmann et al. |
| 2004/0174847 A1* | 9/2004 | Menon ................. G06Q 10/087 370/310 |
| 2005/0090224 A1 | 4/2005 | Dorsey et al. |
| 2006/0035662 A1 | 2/2006 | Jeong et al. |
| 2006/0075073 A1* | 4/2006 | Bichot .................... H04L 12/14 709/220 |
| 2007/0060097 A1 | 3/2007 | Edge et al. |
| 2008/0076386 A1 | 3/2008 | Khetawat et al. |
| 2008/0207170 A1 | 8/2008 | Khetawat et al. |
| 2010/0323662 A1* | 12/2010 | Dahlen ................. H04W 48/02 455/410 |

\* cited by examiner

METHOD FOR SUPPORTING AN EMERGENCY CALL IN A MOBILE COMMUNICATION SYSTEM

CROSS-REFERENCE TO RELATED APPLICATION(S)

This application is a continuation application of a prior application Ser. No. 14/457,832, filed on Aug. 12, 2014, and issued as U.S. Pat. No. 9,344,871 on May 17, 2016, which is a continuation application of a prior application Ser. No. 13/001,868, filed on Dec. 29, 2010, which issued as U.S. Pat. No. 8,818,323 on Aug. 26, 2014, and which claimed the benefit under 35 U.S.C. §371 of an International application filed on Jul. 2, 2009 and assigned Application number PCT/KR2009/003624 which claimed the benefit of a Chinese patent application filed on Jul. 4, 2008 in the Chinese Intellectual Property Office and assigned Serial number 200810128235.3, the entire disclosure of each of which is hereby incorporated by reference.

TECHNICAL FIELD

The present disclosure relates to the communication field, especially to a method for supporting an emergency call in a mobile communication system.

BACKGROUND ART

The existing structure of the 3rd Generation Mobile Communication System Partnership Project (hereinafter referred to as 3GPP) is shown in FIG. 1. The description of the 3GPP system structure shown in FIG. 1 is given below.

A User Equipment (hereinafter referred to as UE) 101 is a terminal device for receiving data. A Node B 102 is a node responsible for radio transmitting/receiving in a Radio Network Subsystem (RNS). A Controlling Radio Network Controller (hereinafter referred to as CRNC) 103 is a radio network controller which directly controls a Node B. The interface between a Radio Network Controller (hereinafter referred to as RNC) and the UE is known as the air interface. A Serving Radio Network Controller (hereinafter referred to as SRNC) 104 is a RNC which controls bearer information, such as the Radio Resource Control (hereinafter referred to as RRC) status. The interface between the SRNC and the CRNC is the interface known as Iur. A Gateway General Packet Radio Service (the General Packet Radio Service is hereinafter referred to as GPRS) Supporting Node (the Gateway GPRS Supporting Node is hereinafter referred to as GGSN) 105 and a Serving GPRS Supporting Node (hereinafter referred to as SGSN) 106 provide routing function for data transmission. The interface between the SGSN and the RNC is the interface known as Iu. E-PDN 107 is an external public data network providing data source.

The system structure of the System Architecture Evolution (SAE) is illustrated in FIG. 2. The description of the SAE system structure shown in FIG. 2 is given below.

A User Equipment (hereinafter referred to as UE) 201 is a terminal device for receiving data. An EUTRAN 202 (also known as eNB), which is the radio access network of the evolution system SAE, is responsible for providing a LTE (Long Term Evolution) mobile phone with the access to the radio network. The eNB is also connected to a mobility management entity (MME) 203 of the mobile phone and a user plane entity (Serving Gateway) 204 via an interface S1. A MME 203 is responsible for managing mobile contexts and session contexts of the UE and for saving user information on security. Serving Gateway (Serving GW) 204 mainly provides functions of the user plane. An interface S1-MME is responsible for establishing a radio access bearer for the UE and forwarding messages from the UE to the MME via the radio access network. The combined function of the MME 203 and the Serving Gateway 204 is similar to that of the original SGSN 206. Both the MME and the Serving Gateway may be located at the same physical entity. A PDN Gateway 205 is responsible for functions like billing, lawful interception and the like. In addition, both the Serving Gateway and the PDN Gateway may be located at the same physical entity. The SGSN 206 is now configured to provide routing function for data transmission in the UMTS. The existing SGSN is configured to find out the corresponding Gateway GPRS Supporting Node (GGSN) based on an Access Point Name (APN). A HSS 207 is a home subscriber subsystem which is responsible for storing user information including the current location of the UE, the address of a serving node, user information on security, Packet Data Protocol (PDP) context activated by the UE and so on. PCRF 208 provides QoS policies and billing criteria via an interface S7.

In general, a user data stream passes through the PDN Gateway 205 to the Serving Gateway 204 which then transmits the data to the eNB where the UE locates using a GPRS Tunneling Protocol (GTP) channel. The eNB then transmits the data to a corresponding UE.

FIG. 3 shows the structure of the interface S1 in the SAE, where an EPC is a core network of the evolution. Each eNB is connected with a plurality of MMEs in a MME pool. Each eNB is further connected to a plurality of S-GWs in a S-GW Pool.

A HNB (including 3G HNB, LTE HNB and an HNB in another access system) is a Node B applied in a home and can be applied in such a site as a university, a company and so on. The HNB is a Plug-and-Play device, and can be of an open type and a closed subscriber group type. The difference between a HNB of the closed subscriber group type and a common macro base station lies in that typically not all the UEs are permitted to access the HNB. For instance, only UEs which belong to a user's home or are permitted by one of the family members to access the HNB are permitted to access the HNB of the home. For a HNB in a company, only the company's staff and its granted partners are permitted to access the HNB. A HNB group having the same access subscriber set (e.g., HNBs arranged in the same company) is referred to as a CSG (Closed Subscriber Group).

The structure of a 3G HNB is illustrated in FIG. 4, where a UTRAN includes a 3G HNB and a 3G HNB GW. The HNB and the HNB GW constitute a HNB RAN. The 3G HNB performs the functions of an original Node B and some functions of the RNC, such as RRC, RLC, MAC, etc. The 3G HNB GW, which is a node connected to the core network, includes the functions of a NNSF. The interface between the HNB and the HNB GW is known as Iuh. The 3G HNB GW accesses the core network via the Iu interface.

The HNB or the HNB GW can perform the access control of the UE. The HNB or the HNB GW stores a list of UEs identity which the HNB is permitted to access. When the HNB RAN receives a message from UE, it is determined whether the UE is permitted to be accessed or not based on the UE's IMSI. If no IMSI is contained in the received message, the HNB RAN can transmit an identification request message to the UE. The UE'S IMSI can be obtained once a response message from the UE is received. There is no final conclusion on which one of the HNB and the HNB GW is more suitable to perform the access control of the UE.

By far, most companies support a decision that the HNB GW should perform the access control of the UE, e.g., the access of the UE is permitted or not.

In existing communication systems, after a radio resource management entity (such as a HNB, a RNC or an eNB) receives a Radio Link Setup Request message from a UE, it is known that there is an emergency service based on the information element Establishment Cause in the message. However, the upper-layer node (e.g., a SGSN or a HNB GW) of the radio resource management entity does not know that the service to be accessed is an emergency service. Therefore, the upper-layer node of the radio resource management entity may perform the access control of the UE, which may result in a failure or delay of the access of the emergency service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for supporting an emergency service in a mobile communication system. By including emergency service indication in the first message transmitted by a radio resource management entity to its upper-layer node to inform its upper-layer node that the service to be accessed is an emergency service, its upper-layer node can thus treat the service as an emergency one such that the resources allocation to the service can be prioritized without access control.

In accordance with an aspect of the present disclosure, a method for supporting an emergency service by a mobility management entity (MME) in a mobile communication system is provided. The method includes receiving, by the MME, a first message including information associated with an attach request of a terminal from a base station, determining, by the MME, whether the attach request is accepted based on information indicating an emergency service included in the first message, and transmitting, by the MME, a second message to the base station if the attach request is accepted. If the information associated with the attach request includes the information indicating the emergency service, the attach request is accepted. The information indicating the emergency service is included in the first message using information included in a third message received from the terminal.

In accordance with an aspect of the present disclosure, a MME is provided. The MME includes a communication unit configured to receive, from a base station, an first message including information associated with an attach request of a terminal and transmit, to the base station, a second message if the attach request is accepted, and a control unit configured to determine whether the attach request is accepted based on information indicating an emergency service included in the first message. The information associated with the attach request includes the information indicating the emergency service, the attach request is accepted. The information indicating the emergency service is included in the first message using information included in a third message received from the terminal.

In accordance with an aspect of the present disclosure, a method for supporting an emergency service by a base station in a mobile communication system is provided. The method includes receiving, by the base station, a first message including information associated with an attach request of a terminal from the terminal, including, by the base station, the information associated with the attach request in a second message, transmitting, by the base station, the second message to a MME, receiving, by the base station, if the attach request is accepted, a third message from the MME. If the information associated with the attach request includes information indicating an emergency service, the attach request is accepted. The information indicating the emergency service is included in the second message using information included in the first message.

In accordance with an aspect of the present disclosure, a base station is provided. The base station includes a communication unit configured to receive, from a terminal, a first message including information associated with an attach request of the terminal and receive a second message from a MME if the attach request is accepted, and a controller configured to include the information associated with the attach request in a third message and control transmitting the third message to the MME. If the information associated with the attach request includes information indicating an emergency service, the attach request is accepted. The information indicating the emergency service is included in the third message using information included in the first message.

In accordance with an aspect of the present disclosure, a method for supporting an emergency call in a mobile communication system is provided. The method includes receiving, at a radio resource management entity, a message from a UE indicating that there is an emergency call, setup a RRC connection between the UE and the radio resource management entity, transmitting, by the radio resource management entity, a message to its upper-layer node, the message containing emergency service indication, the upper-layer node does not perform access control in case radio resource management entity indicating emergency service, and establishing, by the upper-layer node of the radio resource management entity, the emergency call for the UE.

With the method for supporting an emergency service in a mobile communication system provided in the present disclosure, the access failure of an emergency service can be reduced, and the access speed of the emergency service can be increased.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
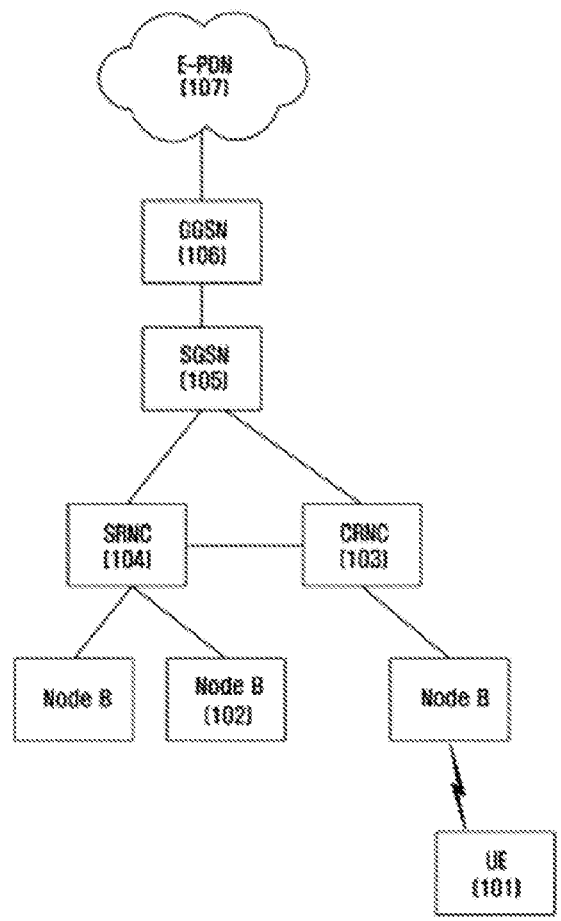
FIG. 1 shows the existing 3GPP system structure according to the related art.
Figure 2:
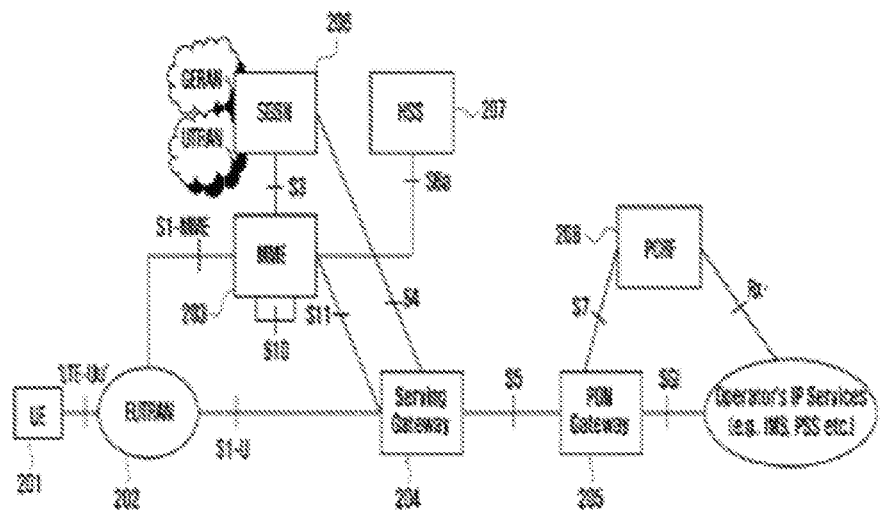
FIG. 2 shows the structure of a SAE system network according to the related art.
Figure 3:
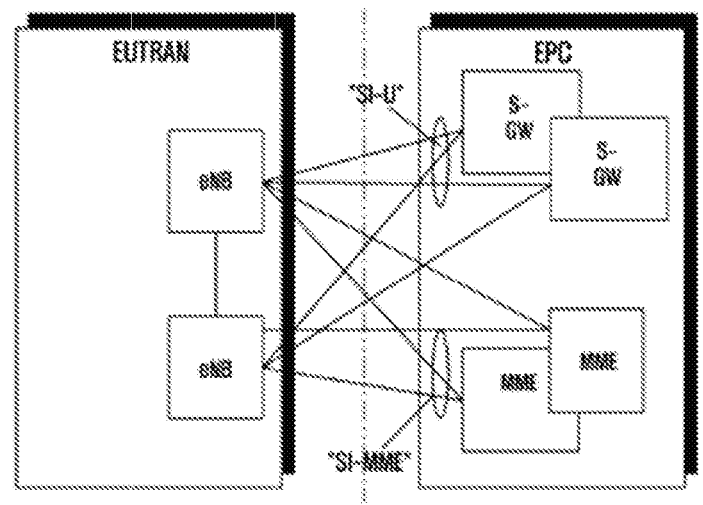
FIG. 3 shows the structure of the S1 interface according to the related art.
Figure 4:
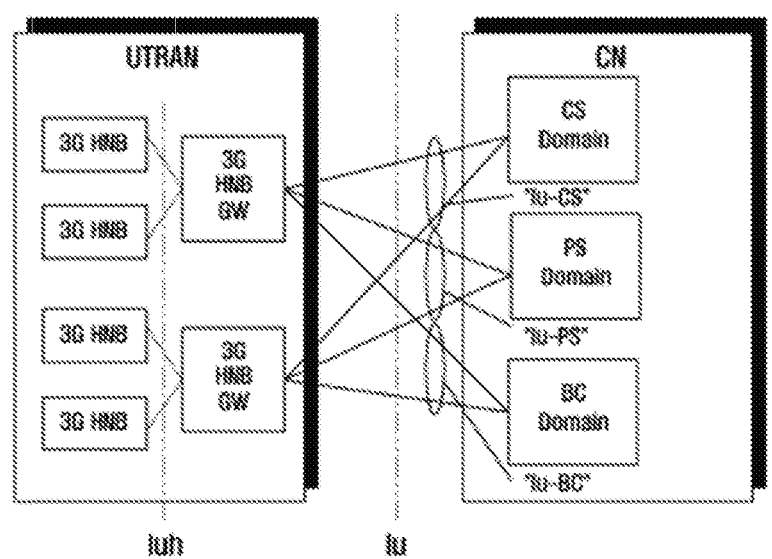
FIG. 4 shows the structure of a 3G HNB according to the related art.
Figure 5:
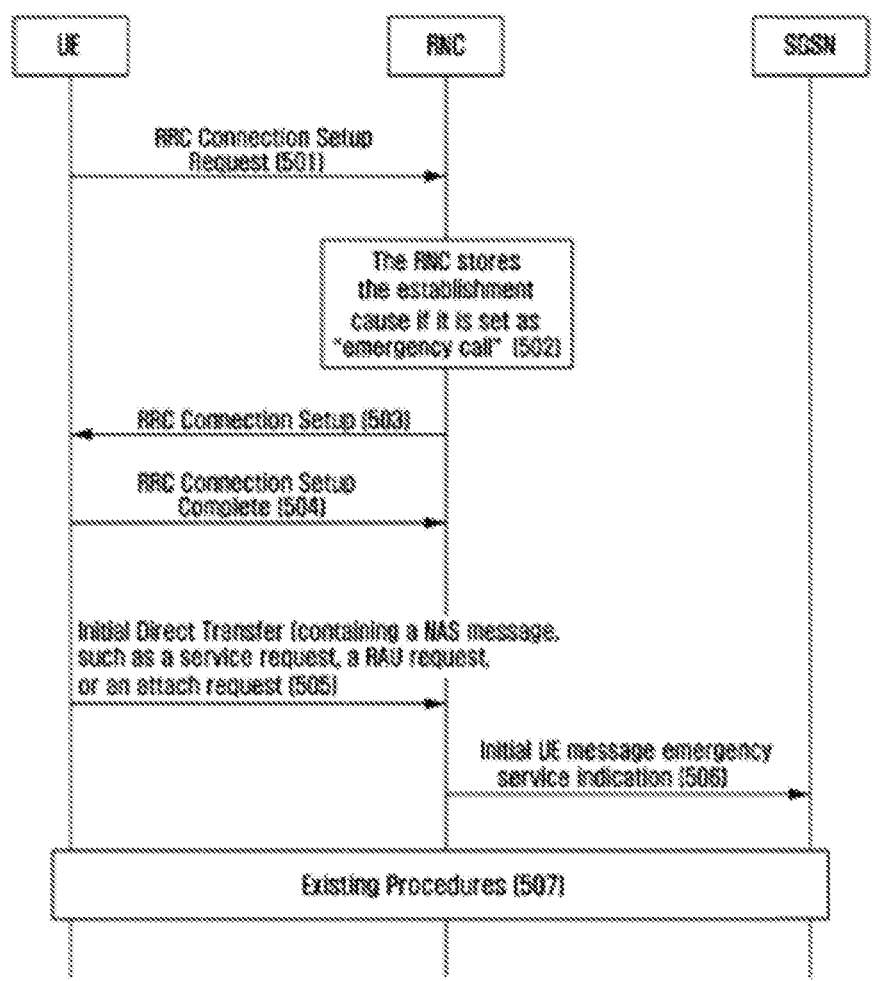
FIG. 5 shows the method for informing a SGSN of an emergency service in a 3G system according to an embodiment of the present disclosure.

FIG. 5 shows an embodiment in which the present method is applied in a 3G system. The detailed description of this embodiment is given below. Here, detailed technical descriptions irrelevant to the present disclosure are omitted.

A UE operating in an idle mode desires to initiate an emergency service. Therefore, it initiates a RRC connection setup process. A UE transmits 501 a RRC Connection Setup Request message to a RNC, in which the information element Establishment Cause is set as "emergency call". After receiving the message, the RNC stores the establishment cause if it is set as "emergency call". In any other cases, the necessity for the RNC to store the establishment cause is irrelevant. It is not necessary for the RNC to perform the access control of the UE based on whether the UE is authorized to be accessed or not (for example, it is not necessary to determine whether the UE is permitted to access the current cell). The present disclosure does not focus on the access control of services based on the status of radio resource. The RNC transmits 503 a RRC Connection Setup message to the UE which then transmits 504 a RRC Connection Setup Complete message to the RNC. The UE transmits 505 an Initial Direct Transfer message to the RNC, which contains a Non-Access Stratum (NAS) message, such as a service request, a Routing Area Update (RAU) request, or an attach request, etc.

The RNC transmits 506 an Initial UE message to the SGSN. The message contains Emergency Service Indication, which is only present when the establishment cause for the RRC connection is set as "emergency service". The message further contains the NAS message in 505.

The SGSN then receives the Initial UE message. If there is an emergency service indication in the received message, it is not necessary for the SGSN to perform the access control of the UE based on whether the UE is authorized to be accessed (e.g., it is not necessary to determine whether the UE is permitted to access the current service area which comprises a routing area (RA) and a location area (LA)).

The SGSN performs 507 the existing procedures according to the NAS message received in 506. For example, if the message received in step 506 is a service request message, the SGSN determines whether to transmit a service accept message (a NAS message) to the UE or not according to the prior art, and then initiates a Radio Access Bearer (RAB) setup procedure. If the message received in 506 is a Routing Area Update Request message, the SGSN transmits a RAU Accept message (a NAS message) to the UE. All these procedures are the same as the prior art, and detailed technical descriptions are therefore omitted here. The transmission of the NAS message from the SGSN to the UE is performed using a direct transfer message via the Iu interface and a Downlink Direct Transfer message via the air interface.

Figure 6:
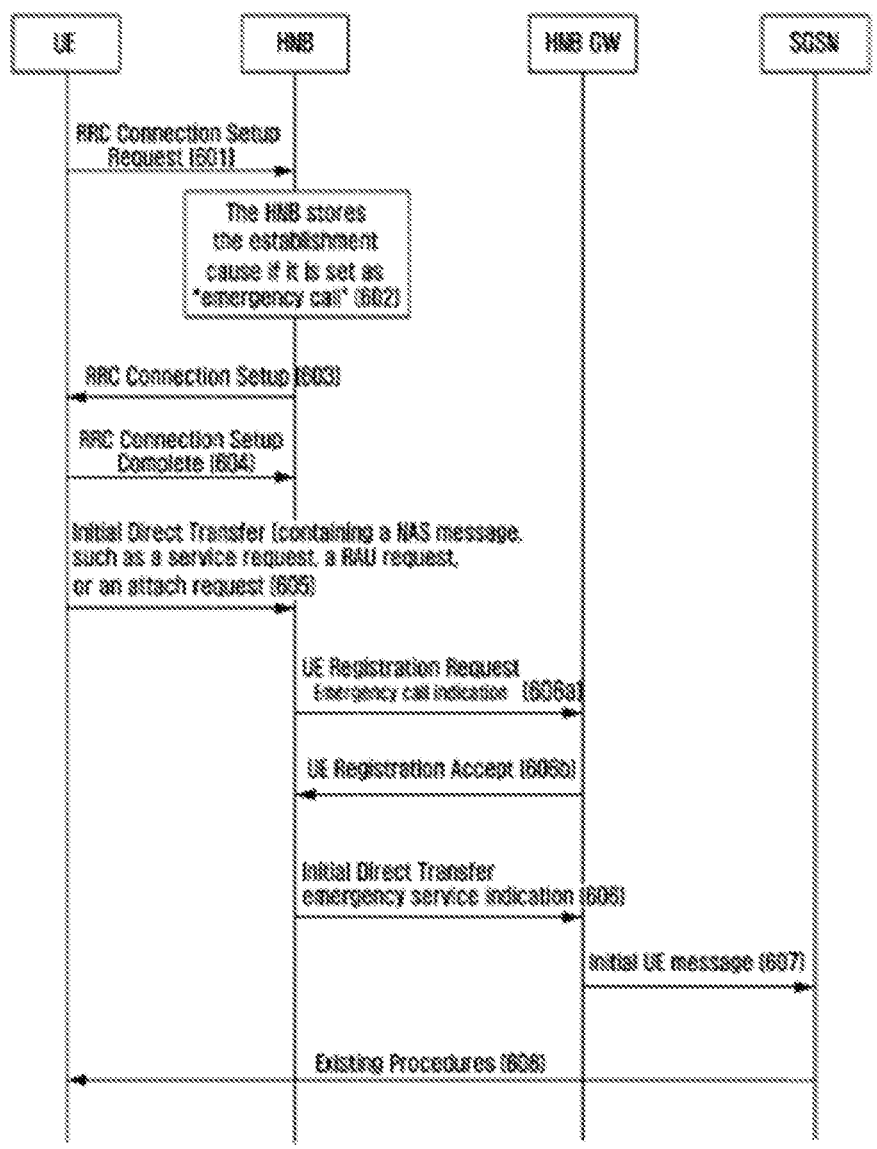
FIG. 6 shows the method for informing a HNB GW of an emergency service in a 3G system according to an embodiment of the present disclosure.
Figure 9:
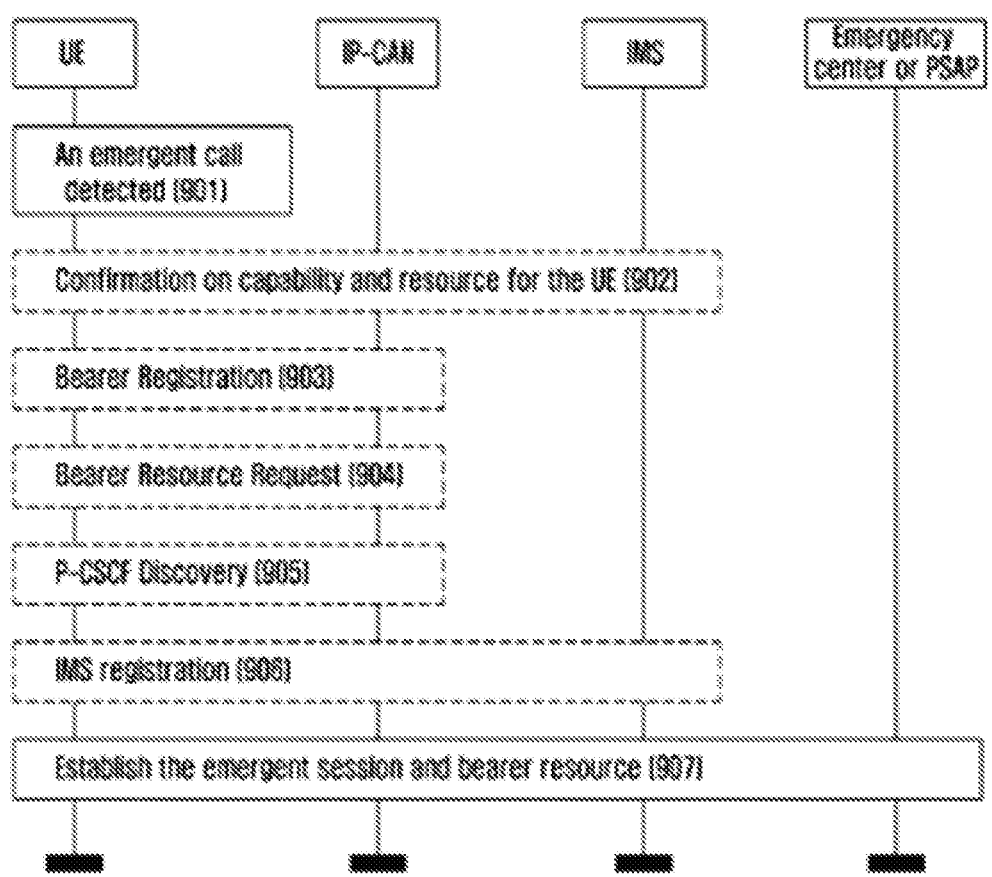
FIG. 9 shows the access flow of an IMS emergency service according to an embodiment of the present disclosure.

If the emergency call to be accessed is an IMS emergency service, IMS signaling is exchanged between the UE and IMS entities, as illustrated in FIG. 9. FIG. 6 shows an embodiment in which the present method is applied in a 3G HNB system. The detailed description of this embodiment is given below. Here, detailed technical descriptions irrelevant to the present disclosure are omitted.

A UE operating in an idle mode desires to initiate an emergency service. Therefore, it initiates a RRC connection setup process. A UE transmits 601 a RRC Connection Setup Request message to a HNB, in which the information element Establishment Cause is set as "emergency call". After receiving the message, the HNB stores the establishment cause if it is set as "emergency call". In any other cases, the necessity for the HNB to store the establishment cause is irrelevant. It is not necessary for the HNB to perform the access control of the UE based on whether the UE is authorized to be accessed or not (for example, it is not necessary to determine whether the UE is permitted to access the current HNB cell). The present disclosure does not focus on the access control of services based on the status of radio resource. The HNB transmits 603 a RRC Connection Setup message to the UE which then transmits 604 a RRC Connection Setup Complete message to the HNB. The UE transmits 605 an Initial Direct Transfer message to the HNB, which contains a Non-Access Stratum (NAS) message, such as a service request, a RAU request, or an attach request, etc.

The HNB transmits 606 an Initial Direct Transfer message to a HNB GW. The message is an access stratum message between the HNB and the HNB GW, such as a HNBAP (Home Node B Application Protocol) message. The message contains Emergency Service Indication, which is only present when the establishment cause for the RRC connection is set as "emergency service". The message further contains the NAS message in 605. The HNB GW then receives the Initial Direct Transfer message. If there is an emergency service indication in the received message, it is not necessary for the HNB GW to perform the access control of the UE (e.g., it is not necessary for the HNB GW to determine whether the UE is authorized to access the current HNB). Alternatively, if no IMSI of the UE is included in the message, the HNB GW does not need to perform an identification request process to acquire the UE's IMSI from the UE.

Alternatively, the HNB performs a UE registration process prior to transmitting the Initial Direct Transfer message to the HNB GW. For this purpose, 606a, the HNB transmits a UE Registration Request message to the HNB GW, which contains a registration type and a HNB ID. The message further contains a UE ID if the registration type is set as UE. Alternatively, the HNB can transmit an emergency service indication to the HNB GW using the UE Registration Request message. It is not necessary for the HNB GW to perform the access control of the UE (e.g., it is not necessary for the HNB GW to determine whether the UE is authorized to access the current HNB). 606b, The HNB GW accepts the access of the UE and transmits a Registration Accept message to the HNB. Then it goes to step 606. If an emergency service indication is included by the HNB in the UE Registration Request message, it is not necessary to include an emergency service indication in the Initial Direct Transfer message in step 606.

The HNB GW transmits 607 a RANAP message, Initial UE, to the SGSN, which contains a NAS message and, optionally, emergency service indication. After receiving the message, the SGSN does not need to perform the access control of the UE based on whether the UE is authorized to be accessed if there is emergency service indication in the received message (e.g., it is not necessary to determine whether the UE is permitted to access the current service area which comprises a routing area (RA) and a location area (LA)). In this case, the SGSN can prioritize the resource allocation to the emergency service.

The SGSN transmits 608 a downlink NAS message to the UE according to the NAS message received in 607. The transmission of the NAS message from the SGSN to the UE is performed using a direct transfer message via the Iu interface, a direct transfer message via the Iuh interface and a Downlink Direct Transfer message via the air interface.

The SGSN performs 608 the existing procedures according to the NAS message received in 607. For example, if the message received in step 607 is a service request message, the SGSN determines whether to transmit a service accept message (a NAS message) to the UE or not according to the prior art, and then initiates a Radio Access Bearer (RAB) setup procedure. If the message received in 607 is a Routing Area Update Request message, the SGSN transmits a RAU Accept message (a NAS message) to the UE. All these procedures are the same as the prior art, and detailed technical descriptions are therefore omitted here. The transmission of the NAS message from the SGSN to the UE is performed using a direct transfer message via the Iu interface, a direct transfer message via the Iuh interface and a Downlink Direct Transfer message via the air interface.

If the emergency call to be accessed is an IMS emergency service, IMS signaling is exchanged between the UE and IMS entities, as illustrated in FIG. 9.

In a case where the HNB GW is included in a LTE HNB structure, the supporting of emergency services in the LIE HNB is the same as that illustrated in FIG. 6. In this case, the functions of the SGSN shown in FIG. 6 are performed in a MME. Step 608 corresponds to the existing procedures in LTE (e.g., the initial context establishment procedure, the radio bearer setup procedure and the TAU accept procedure). If there is no HNB GW in the LTE HNB, the supporting of emergency services in the LTE HNB is the same as that illustrated in FIG. 7.

Figure 7:
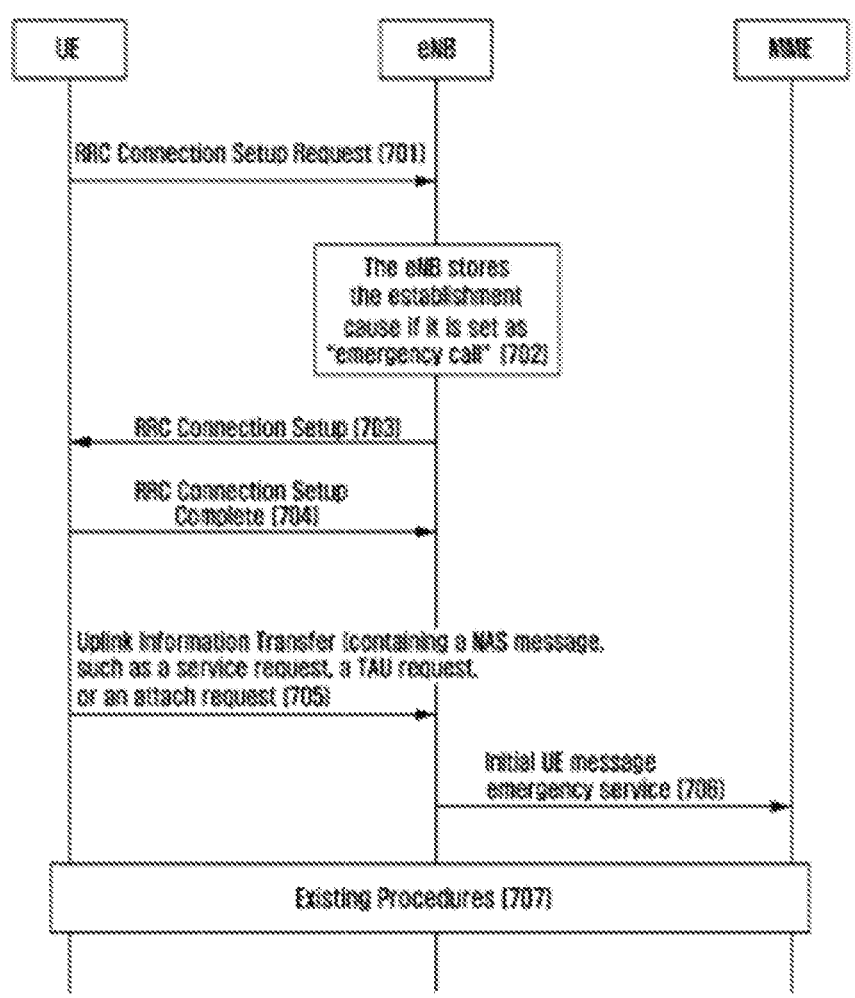
FIG. 7 shows the method for informing a MME of an emergency service in the SAE system according to an embodiment of the present disclosure.

FIG. 7 shows an embodiment in which the present method is applied in a SAE system. The detailed description of this embodiment is given below. Here, detailed technical descriptions irrelevant to the present disclosure are omitted.

A UE operating in an idle mode desires to initiate an emergency service. Therefore, it initiates a RRC connection setup process. A UE transmits 701 a RRC Connection Setup Request message to an eNB, in which the information element Establishment Cause is set as "emergency call". After receiving the message, the eNB stores the establishment cause if it is set as "emergency call". In any other cases, the necessity for the eNB to store the establishment cause is irrelevant. It is not necessary for the eNB to perform the access control of the UE based on whether the UE is authorized to be accessed or not (for example, it is not necessary to determine whether the UE is permitted to access the current cell). The present disclosure does not focus on the access control of services based on the status of radio resource. The eNB transmits 703 a RRC Connection Setup message to the UE which then transmits 704 a RRC Connection Setup Complete message to the eNB. The UE transmits 705 a Uplink Information Transfer message to the eNB, which contains a Non-Access Stratum (NAS) message, such as a service request, a tracking area update (TAU) request, or an attach request, etc.

The eNB transmits 706 an Initial UE message to a MME. The message contains Emergency Service Indication, which is only present when the establishment cause for the RRC connection is set as "emergency service". The message further contains the NAS message in 705.

The MME then receives the Initial UE message. If there is emergency service indication in the received message, it is not necessary for the MME to perform the access control of the UE based on whether the UE is authorized to be accessed (e.g., it is not necessary to determine whether the UE is permitted to access the current service area which comprises a TA, a location area, etc.).

The MME performs 707 the existing procedures according to the NAS message received in 706. For example, if the message received in step 706 is a service request message, the MME initiates an initial context setup procedure, including a Radio Access Bearer Setup procedure. If the message received in step 706 is a TAU Request message, the MME transmits a TAU Accept message (a NAS message) to the UE. All these procedures are the same as the prior art, and detailed technical descriptions are therefore omitted here. The transmission of the NAS message from the MME to the UE is performed using a downlink NAS transport message via the S1 interface and a Downlink Information Transfer message via the air interface.

If the emergency call to be accessed is an IMS emergency service, IMS signaling is exchanged between the UE and IMS entities. This process is the same as the prior art, and detailed technical descriptions are therefore omitted here.

Figure 8:
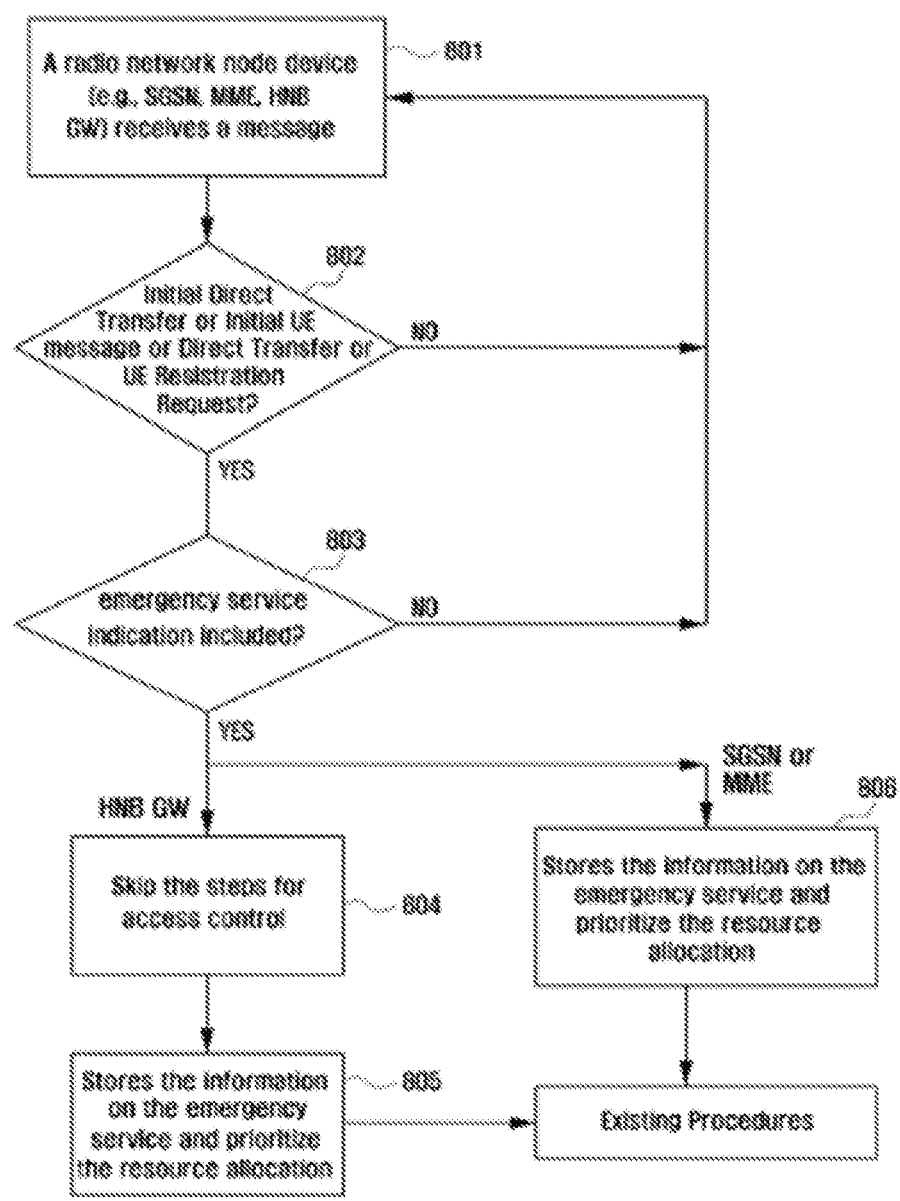
FIG. 8 shows the flow of operations performed in SGSN, MME and HNB GW according to an embodiment of the present disclosure.

Here, the operation flow of the node which receives the emergency service indication (e.g., the SGSN in FIG. 5, the HNB GW or SGSN in FIG. 6 and the MME in FIG. 7) is illustrated in FIG. 8 whose detailed description will be given in the following. Here, detailed technical descriptions irrelevant to the present disclosure are omitted.

A radio network node device (e.g., a SGSN, a MME or a HNB GW) receives 801 a message. In a case where the received message is an Initial Direct Transfer message 606 or an Initial UE message 506 or 706 from a radio network resource management entity (e.g., a RNC, an eNB, a HNB or a HNB GW) in step 802 and the message contains an emergency service indication in step 803, the process proceeds with step 804 if the corresponding radio network node device is a HNB GW. Otherwise, the process proceeds with step 806 if the corresponding radio network node device is a SGSN or a MME.

In step 804, if the received message contains emergency service indication, it is not necessary for the HNB GW to perform the access control of the UE (e.g., to check whether the UE is in the registration list of the HNB or not). The HNB GW forwards the received NAS message to a core network node device (e.g., a SGSN or a MIME).

Alternatively, in step 805, the HNB GW stores information on the emergency service. If the HNB GW is associated with the resource allocation function, it needs to prioritize the resource allocation to the UE. All other procedures are the same as the prior art, and detailed technical descriptions are therefore omitted here.

In step 806, the SGSN or MME stores the information on emergency service. Alternatively, it is not necessary for the SGSN or MME to perform the access control of the UE based on whether the UE is authorized to be accessed (e.g., it is not necessary to determine whether the UE is permitted to access the current service area which comprises a routing area (RA) and a location area (LA)). The SGSN or MME prioritizes the resource allocation to the service to be accessed. All other procedures are the same as the prior art, and detailed technical descriptions are therefore omitted here.

The main operation flow in which an IMS emergency service is detected by the UE is illustrated in FIG. 9 whose detailed description will be given in the following.

A request for establishing an emergency session is detected 901 by the UE.

The following steps 902 through 906 can be skipped under certain conditions.

In step 902, if there is no sufficient resource or capability for the UE to establish an emergency call due to other active sessions, the UE should terminate the current communication to release the preserved bearer resource.

In step 903, if the bearer registration process is required but it has not been performed yet, the UE should perform the bearer registration with an IP-CAN (IP connection access network). Subsequently, the bearer registration process is no longer required.

In this stage, the IP-CAN can assign an IP address to the UE.

In step 904, if it is necessary for the IP-CAN to preserve bearer resource for the transmission of the IMS signaling, the UE should preserve the resource in the IP-CAN. If no IP address is assigned to the UE by the IP-CAN in step 904, the IP-CAN should assign an IP address to the UE during the bearer resource request process.

In step 905, the UE performs a P-CSCF (Proxy-call session control function) discovery process. The P-CSCF in local network suitable for emergency session is discovered by the UE, wherein the detailed P-CSCF discovery method depends on the IP-CAN.

In step 906, if the UE is sufficiently trusted such that it is authorized to verify an IMS network, the UE initiates an IMS emergency registration process. The UE provides the IP address obtained in step 903 or 904 to the P-CSCF selected in step 905. The IP address for signaling is assigned in step 903 or 904 in a synchronous manner. The IMS registration request should contain an emergency common user ID. The implicitly registered emergency common user ID should contain an associated Tel URI (unified resource ID), which is used to call the user back from a PSTN (public switched telephone network). The termination of the requested registration can be set by an S-CSCF (serving CSCF) according to the internal policy of the service system and rule. The subsequent registration procedures are the same as other registration procedures. If the UE is not sufficiently trusted to authenticate an IMS network, it establishes an emergency session with the P-CSCF immediately (as illustrated in step 907) instead of initiating any IMS emergency registration request.

In step 907, if the IMS emergency registration is completed, the UE initiates an IMS emergency session establishment using an IMS session establishment procedure in which an emergency session indicator and an emergency common user ID are incorporated. Otherwise, the UE should initiate an IMS emergency session establishment using an IMS session establishment procedure in which an emergency session indicator and any registered emergency common user ID are incorporated.

From the embodiment shown in FIG. 9, it can be seen that the establishment of the IMS emergency call mainly depends on the IMS signaling. With the method illustrated in FIG. 5, the access stratum of the SGSN is informed that the service to be established is an emergency one and can thereby be treated as an emergency service.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for supporting an emergency service in a wireless communication system, the method comprising:

receiving, by a mobility management entity (MME), a first message including information indicating an emergency service for a terminal, from a base station;

determining, by the MME, whether authentication for the terminal is skipped based on the information indicating the emergency service; and transmitting, by the MME, a second message to the base station if the authentication for the terminal is skipped.

2. The method of claim 1, wherein the information is included in the first message, by the base station, based on information included in a radio resource control (RRC) message received from the terminal.

3. The method of claim 2, wherein the RRC message received from the terminal includes an attach request message.

4. The method of claim 1, wherein the first message includes an attach request message received from the terminal.

5. The method of claim 4, wherein the attach request message is included in an initial user equipment (UE) message.

6. The method of claim 1, wherein the first message further includes information for identifying the terminal.

7. A mobility management entity (MME) comprising:
a transceiver for receiving and transmitting signals; and
a controller configured to:
   receive, from a base station, a first message including information indicating an emergency service for a terminal,
   determine whether authentication for the terminal is skipped based on the information indicating the emergency service, and
   transmit, to the base station, a second message if the authentication for the terminal is accepted.

8. The MME of claim 7, wherein the information is included in the first message, by the base station, based on information included in a radio resource control (RRC) message received from the terminal.

9. The MME of claim 8, wherein the RRC message received from the terminal includes an attach request message.

10. The MME of claim 7, wherein the first message includes an attach request message received from the terminal.

11. The MME of claim 10, wherein the attach request message is included in an initial user equipment (UE) message.

12. The MME of claim 7, wherein the first message further includes information for identifying the terminal.

13. A method for supporting an emergency service by a base station in a wireless communication system, the method comprising:
   transmitting, by a base station, a first message including information indicating an emergency service for a terminal, to a mobility management entity (MME); and
   receiving, by the base station, a second message from the MME if authentication for the terminal is skipped,
   wherein the authentication for the terminal is skipped by the MME if the first message includes the information indicating the emergency service.

14. The method of claim 13, further comprising:
   receiving, by the base station, a third message including information associated with an attach request of the terminal from the terminal.

15. The method of claim 13, wherein the first message further includes information for identifying the terminal.

16. The method of claim 13, wherein the first message is an initial user equipment (UE) message and includes an attach request message.

17. The method of claim 13, wherein the second message includes an attach accept message.

18. A base station comprising:
a transceiver for receiving and transmitting signals; and
a controller configured to:
   transmit, to a mobility management entity (MME), a first message including the first information and second information indicating an emergency service, and
   receive, from the MME, a second message if authentication for the terminal is skipped,
   wherein the authentication for the terminal is skipped by the MME if the second message includes the second information indicating the emergency service.

19. The base station of claim 18, wherein the controller further configured to:
   receive, from the terminal, a third message including information associated with an attach request of the terminal.

20. The base station of claim 18, wherein the first message further includes information for identifying the terminal.

21. The base station of claim 18, wherein the first message is an initial user equipment (UE) message and includes an attach request message.

22. The base station of claim 18, wherein the second message includes an attach accept message.

* * * * *

UNITED STATES PATENT AND TRADEMARK OFFICE
CERTIFICATE OF CORRECTION

PATENT NO. : 9,730,251 B2  
APPLICATION NO. : 15/155591  
DATED : August 8, 2017  
INVENTOR(S) : Lixiang Xu et al.

Page 1 of 1

It is certified that error appears in the above-identified patent and that said Letters Patent is hereby corrected as shown below:

In the Claims

In Claim 7, (Column 11, Line 11), replace the word "accepted" with --skipped--.

In Claim 18, (Column 12, Lines 16 and 17), delete the phrase "the first information and second".

In Claim 18, (Column 12, Lines 22 and 23), replace the phrase "if the second message includes the second information" with the phrase --if the first message includes the information--.

Signed and Sealed this  
Nineteenth Day of May, 2020

Andrei Iancu  
*Director of the United States Patent and Trademark Office*